US007479956B2

(12) United States Patent
Shaw-Weeks

(10) Patent No.: US 7,479,956 B2
(45) Date of Patent: Jan. 20, 2009

(54) METHOD OF VIRTUAL GARMENT FITTING, SELECTION, AND PROCESSING

(75) Inventor: Tanya Anne Shaw-Weeks, Windsor Junction (CA)

(73) Assignee: Unique Solutions Design LTD., Dartmouth, Nova Scotia (CA)

( * ) Notice: Subject to any disclaimer, the term of this patent is extended or adjusted under 35 U.S.C. 154(b) by 1191 days.

(21) Appl. No.: 10/271,987

(22) Filed: Oct. 17, 2002

(65) Prior Publication Data
US 2003/0076318 A1 Apr. 24, 2003

Related U.S. Application Data

(60) Provisional application No. 60/330,113, filed on Oct. 19, 2001.

(51) Int. Cl.
G06T 15/00 (2006.01)
G09G 5/00 (2006.01)
(52) U.S. Cl. .................. 345/419; 345/6; 345/653; 345/664; 345/679; 348/51
(58) Field of Classification Search ............ 345/419, 345/435, 420, 423, 428, 473, 630, 427, 582, 345/585, 629, 632, 633, 634, 6, 653, 664, 345/679, 11; 700/130, 134, 136, 128; 705/132, 705/131; 348/51
See application file for complete search history.

(56) References Cited

U.S. PATENT DOCUMENTS

| 4,509,123 | A  | * | 4/1985  | Vereen ...................... 700/130 |
| 6,310,627 | B1 | * | 10/2001 | Sakaguchi .................. 345/630 |
| 6,473,671 | B1 | * | 10/2002 | Yan ........................... 700/134 |
| 6,504,546 | B1 | * | 1/2003  | Cosatto et al. .............. 345/473 |
| 6,650,339 | B1 | * | 11/2003 | Silva et al. .................. 345/619 |

* cited by examiner

Primary Examiner—Kevin M Nguyen

(57) ABSTRACT

A method of garment fitting, selection and creation is provided. The invention provides for the scanning of an individual to provide a photo-realistic virtual 3-D image of the individual in a physically simulated 3-D garment and provides for the use of measurements of the individual to intelligently recommend garments, produce patterns for custom made garments, provide alteration suggestions to fit a garment to the particular individual. The measurements and the photo-realistic 3-D information is stored so that an individual does not need to re-input information or undergo multiple scans, and can shop from home using the previously obtained information profile. Measurements and suggestions can be used by the individual or automatically sent to a manufacturer, dressmaker or tailor for the creation or alteration of a garment to achieve a correct fit for the individual.

41 Claims, 2 Drawing Sheets

METHOD OF VIRTUAL GARMENT FITTING, SELECTION, AND PROCESSING

This Application Claims Priority From U.S. Provisional Application Ser. No. 60/330,113 Filed Oct. 19, 2001

FIELD OF THE INVENTION

This invention relates to the garment industry. More specifically it relates to the fitting, selection and processing of garments.

BACKGROUND OF THE INVENTION

In the field of garment fitting, selection and processing there are a number of methods which are directed towards helping clients obtain a garment of a correct fit, and having a particular appearance. Convenience, efficiency and reliability are important in providing systems which enable clients to obtain clothing which fits properly, and meets their approval visually.

It is common knowledge what is involved with standard ready to wear approaches to providing well fitted clothes which meet a client's visual preferences. Typically, one of the most reliable and traditional approaches of retailers involves providing mirrors, and if needed, changing facilities so that clients may actually try on garments for sale to directly assess the fit and appearance of that garment prior to purchase. This method relies upon the physical presence of garments having a wide variety sizes, fabrics and styles, on a retailer's premises. Additional steps such as the provision of service personnel for consultation, measuring and alteration (a form of garment processing) further helps in achieving a fit and appearance desirable to the client. For clarity, garment processing is hereinafter understood to at least include the process of altering garments and the process of manufacturing or creating garments. Although this approach is reliable, it may not prove to be convenient for busy clients who do not have time, or are too removed geographically to physically relocate themselves to the premises of the garment providing retailer to try on clothing. A desired garment may simply not be available from a local retailer. There also is a lack of efficiency as locating, trying on, and removing garments can be time consuming and requires some physical exertion.

Other traditional approaches are used when a client is not satisfied with buying ready to wear garments or altered ready to wear garments from a retailer. Typically these approaches provide services for the creation of made to measure clothing, or custom made clothing, and requires a different shopping process. Typically a dressmaker or a tailor provides the service by arranging a consultation with the client. At that meeting, the client discusses with the tailor, the garments they would like made, typically with the help of magazines, patterns, etc. depicting ready made garments that would not fit the client, as references. The tailor then measures the client and in consultation with the client, helps the client choose suitable fabrics and styles. The tailor would then begin the process of custom design including many fittings involving the client and the tailor. Once these fittings are concluded the garment is finished and the client receives the made to measure clothing. There are a number of problems associated with this method. The client often encounters difficulty finding both the proper fabric and a suitable tailor; the fabric industry and the tailoring industry not being completely integrated industries. The tailor may take inaccurate measurements, leading to fitting difficulties. The client, although involved in the process of garment creation, does not ever completely know what the final fitted garment will look like which may lead to dissatisfaction once the garment is complete. Tailoring skills to custom fit clothing to any body shape and size are rare and can demand a high premium.

Other well known traditional approaches attempt to mitigate the efficiency and convenience shortfalls of these methods which require clients to physically try on garments or have their measurements taken by a tailor. Examples of such approaches are catalogue based shopping, and more recently online catalogue based shopping. These methods focus on convenience and allow a client to obtain clothing without ever having to physically go to the provider's premises to try on the garment. These methods provide pictures of garments worn by models to help a client decide which garments meet their visual approval. The ordering mechanism typically allows the client to use a rough description of their physical make-up or size, in an attempt to obtain garments of a proper fit. The very convenience of these methods, however, can lead to unreliability because of the difficulties in predicting fit and predicting appearance without actually physically bringing together the garment, and the particular client. In specifying size or physical make-up, a client may be unrealistic about their own measurements or simply inaccurate. Some catalogue and online shopping approaches provide for some customization based on measurements of the client but even so this does not guarantee a proper fit, and still does not address the problem of predicting the appearance of the garment as worn by the client.

Although these traditional methods are each in their turn reliable, and alternatively convenient and efficient, they do not constitute solutions which can be said to be at the same time reliable, convenient, and efficient.

More recent approaches to garment fitting, selection and creation have attempted to solve various areas of the problem but do not provide a complete integrated and coordinated solution.

Some approaches for online shopping of garments allow a client to browse existing inventory through a web site or at a kiosk in a retail location. Some online retailers offer a virtual try on feature. These virtual try on features generally allow a client to choose from a variety of face shapes, body features, hair color and styles of garments. An image is generated using computer graphics, often using simple shaded polygons, from the choices made by the client. This image is either generated from manual input of a client or may involve the use of a scanner. The client can then browse through selected merchandise and try articles on the computer-generated image. This image is not a realistic representation of the client given the limits to the size and shape of the model that can be generated and the facial characteristics, hair styles, and body proportions are often predetermined renderings. The final composite image of the client in the garments is a visual simulation, and does not involve physical simulation of clothing. If a client likes a garment they may purchase the garment in person or online electronically, after which the garment could be shipped to the client. Although this process can provide additional convenience and efficiency it has its own shortfalls with respect to reliability. Some of the problems associated with this process are that the image used to virtually try on garments may not be a true representation of what the client would look like in the garment. The client generally must rely on a generated image alone to choose a garment. These images would not show how the garment would drape and fall on a client's body and for example how tightly it would fit, since the computer generated image can only produce rudimentary visual cues, and is not a physical simulation of the garments. As a result, the client may buy clothing in the wrong size. If a client happens to purchase clothes of the right size there may be certain aspects of the clothes which do not fit. For example the sleeves could be too long, or the pants too short, or some aspect of clothing too tight, too loose, or perhaps drapes differently from the computer image.

It would be desirable for there to be a method of garment fitting, selection, and processing which is convenient, reliable, and efficient, by providing a way of virtually trying on clothing which produces an accurate photo-realistic representation of what the clothing will look like on a client, and avoids the problems of existing methods. It would be desirable for a method which, in addition to providing a client with an accurate virtual representation of how they would look in a garment through a computer generated image, also provides a solution which avoids the problem of a client purchasing clothing which is the incorrect size, or is otherwise too tight, too loose, too long, too short, or does not fit in a certain respect due to the reliance only upon a computer generated image to choose a piece of clothing. It would also be desirable to provide the client access to virtually any design or style of garment rather than relying on the availability of garments at the local retailer premises.

SUMMARY OF THE INVENTION

The present invention provides for a method of garment fitting, selection and processing which provides a photo-realistic virtual 3-D image of an individual in a physically simulated 3-D garment and provides for the use of measurements of the individual to produce patterns for custom made garments, or to provide alteration suggestions to fit a garment to a particular individual. Advantageously, the measurements and the photo-realistic 3-D information is stored so that the individual does not need to re-input information or undergo multiple scans, and can shop from home using the previously obtained information profile. Measurements and suggestions can be used by the individual or automatically sent to a manufacturer, dressmaker or tailor for the creation or alteration of a garment to achieve a correct fit for the individual.

It is to be understood that the term "3-D image" includes any display of an image rendered using 3-D technology whether displayed as a 3-D stereoscopic image, a 2-D projection or rendering, or any other display.

According to a first broad aspect, the invention provides for a method of fitting, selecting and processing a garment for an individual including, spatially measuring the individual to obtain spatial measurements of the individual, obtaining an image of a face and head of the individual, creating and displaying a virtual photo-realistic 3-D image simulating visually and physically how the garment would appear and behave when worn by the individual using the spatial measurements of the individual and the image of a face and head of the individual, and generating specifications for processing the garment using the spatial measurements of the individual and information regarding the garment.

According to a second broad aspect, the invention provides for a method of fitting, selecting and processing garments for an individual including, spatially measuring the individual to obtain spatial measurements of the individual, obtaining an image of a face and head of the individual, storing the spatial measurements of the individual and the image of a face and head of the individual as stored information in an individual profile, providing the individual with a choice of garments to view, creating and displaying a virtual photo-realistic 3-D image simulating visually and physically how a garment chosen by the individual would appear and behave when worn by the individual using the stored information in the individual profile, and generating specifications for processing the chosen garment using the stored information in the individual profile and information regarding the chosen garment.

Some embodiments of the invention provide for sending the specifications for processing the chosen garment for use in processing the chosen garment, processing the chosen garment according to the specifications for processing the chosen garment, and shipping the chosen garment to the individual.

In some embodiments of the invention, spatially measuring the individual includes taking a three dimensional body scan of the individual. In some embodiments of the invention, spatially measuring the individual includes obtaining spatial measurements from the individual.

In some embodiments of the invention, obtaining an image of a face and head of the individual includes taking a visual scan of a face and head of the individual. In some embodiments of the invention, obtaining an image of a face and head of the individual includes obtaining a copy of an image of a face and head of the individual from the individual.

In some embodiments of the invention, providing the individual with a choice of garments to view includes providing web pages for viewing on the internet. In some embodiments of the invention, providing the individual with a choice of garments to view includes providing a computer kiosk at a shopping facility.

In some embodiments of the invention, providing the individual with a choice of garments to view includes providing a list of recommended inventory from an inventory to the individual, in which the list of recommended inventory is generated using the spatial measurements of the individual and the image of a face and head of the individual and information regarding garments of the inventory.

In some embodiments of the invention, simulating visually how a garment would appear includes true color 3-D textured shaded rendering of the garment and the individual.

In some embodiments of the invention, simulating physically how a garment would behave when worn by the individual includes simulating physically how the garment would drape on the individual.

In some embodiments of the invention, generating specifications for processing a garment includes generating a pattern for use in manufacturing the garment. In some embodiments of the invention sending specifications for processing a garment includes automatically sending the pattern for use in manufacturing the garment. In some embodiments of the invention processing a garment includes manufacturing the garment according to the pattern.

In some embodiments of the invention, generating specifications for processing a garment includes generating a recommended set of alterations for use in altering the garment. In some embodiments of the invention sending specifications for processing a garment includes automatically sending the recommended set of alteration for use in altering the garment. In some embodiments of the invention processing a garment includes altering the garment according to the recommended set of alterations.

In some embodiments of the invention, a computer program stored on a computer readable medium is adapted to implement a method of fitting, selecting and processing garments for an individual according to a broad aspect of the invention.

In some embodiments of the invention, an automated system comprising software and hardware is adapted to implement a method of fitting, selecting and processing a garment for an individual according to a broad aspect of the invention.

Other aspects and features of the present invention will become apparent to those of ordinary skill in the art upon review of the following description of a specific embodiment of the invention in conjunction with the accompanying figure.

BRIEF DESCRIPTION OF THE DRAWINGS

The invention will now be described in greater detail with reference to the accompanying diagram, in which.

DETAILED DESCRIPTION OF THE PREFERRED EMBODIMENTS

Figure 1A:
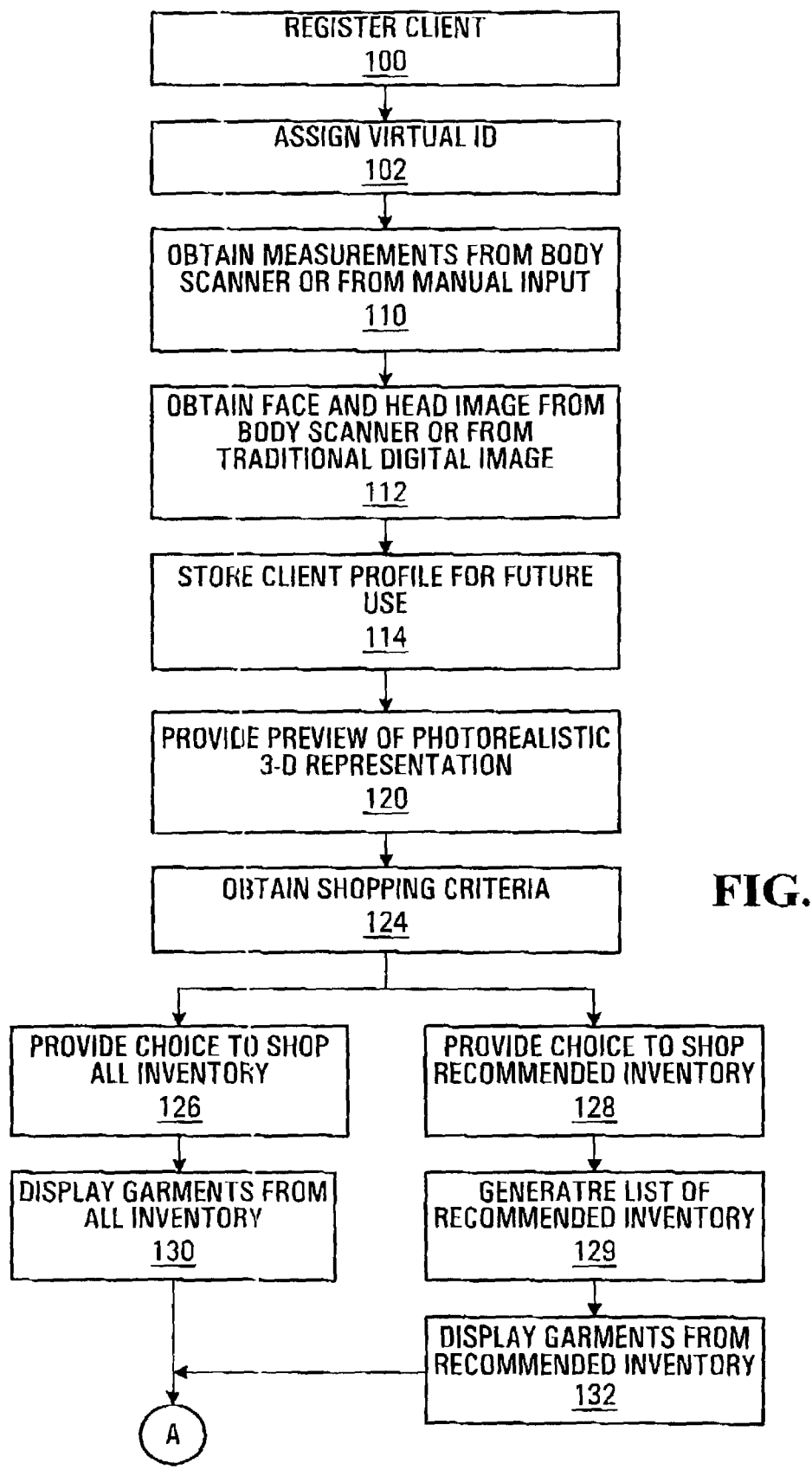
FIGS. 1A and 1B form a flow chart of a preferred embodiment of the invention.
Figure 1B:
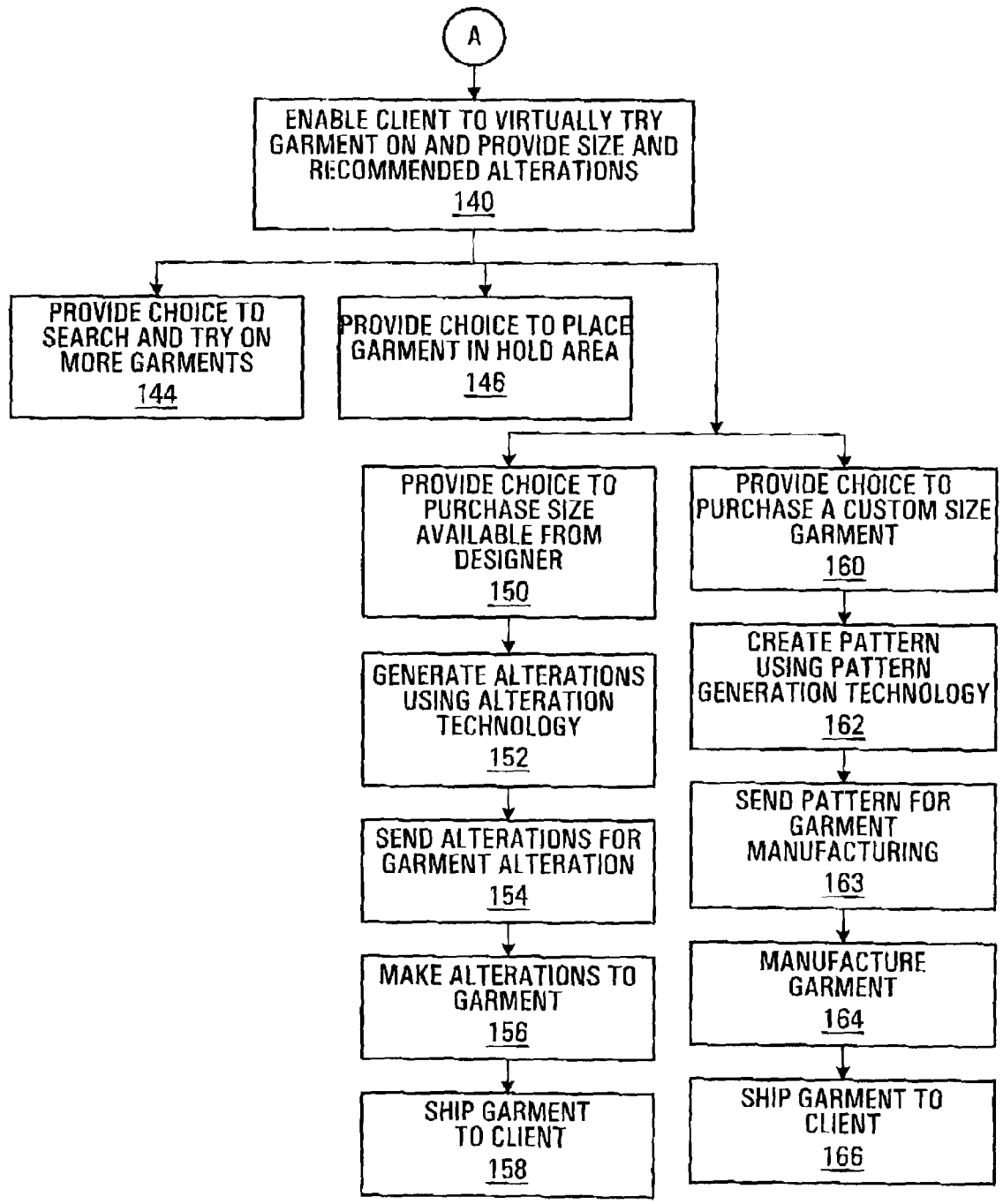

Referring to FIGS. 1A and 1B, a preferred embodiment of the invention will now be described. This example embodiment is a method of garment fitting, selection and processing in a client and garment retailer/manufacturer context. More generally the invention further contemplates other contexts for the fitting, selection and processing of garments.

The method contemplated in the preferred embodiment generally consists of providing a process for setting-up clients on a system, and then providing for the shopping for and ordering of garments by clients.

The first step for setting-up clients begins with client registration in step 100 in which the client provides personal information which will be associated with a client profile and stored for later use. In the preferred embodiment this may include such personal information as mailing address, gender, age etc. At step 102 once the personal information is taken and a client registered, a virtual ID is assigned to the client. The virtual ID allows for tracking of all the information of the stored client profile. In the preferred embodiment, before ant actual virtual shopping session, a client will complete his or her profile by providing measurements of his or her body and in image of his or her face and head. At step 110 this is done with the use of a body scanner which has the capacity to take 3-D measurements (having an appropriate accuracy for use of that information in subsequent steps), or with use of measurements input manually by a client. In the preferred embodiment obtaining manual input of measurements may include receipt of a data file from the client containing three dimensional or other measurements in a format compatible with the system. The next step in the method is to obtain an image of the client's face and head at step 112 through the use of a body scanner which also has the capability to take photographic scans, or with the use of a traditional format image data file provided by the client, which in electronic form could be e-mailed. In an alternative embodiment if the picture were in traditional paper form, the client could provide the picture, after which it could be scanned and entered into the client profile. Once the registration information, virtual ID, measurement information, and face and head image are present in the user profile it is stored for future reuse at step 114. Future reuse allows for the client to reuse the information each time he or she goes online or uses a kiosk on a retailer's premises to shop for garments and try on clothes virtually. Step 114 marks completion of client profile set-up, after which all information in the profile is available for reuse and accessible through the virtual ID. At step 120 the client is provided with a preview photo-realistic 3-D image of themselves in a simulated garment. In the preferred embodiment the photo-realistic preview combines true color texture mapping and shading to render a realistic 3-D image with physical simulation of clothing and its behavior on a client 3-D virtual model. It is to be understood that particulars of the photo-realistic rendering and physical simulation may be different in alternate embodiments, but the preferred embodiment contemplates the use of the true color image of the client's head and face to create a realistic head, the use of the skin tones of the image of the client's face and head to define the skin tone of the virtual body, and displays a true color shaded texture mapped version of the garment on the body. In alternate embodiments this preview is dispensed with until viewing the virtual garments while shopping occurs. With step 124, shopping actually commences. In the preferred embodiment, the client is either at home using a web page provided by a retailer, or is at a computer driven kiosk on the premises of the retailer. At step 124, the client provides shopping criteria, which could include any specification of category to group garments such as price range, style, designer, color, and fit of desired garments. The method then provides the client a choice to shop all inventory at step 126 or to shop recommended inventory at step 128. If the client chooses to shop all inventory the client can browse through a display of all garments from the inventory at step 130 which also meet the shopping criteria obtained at step 124. If the client chooses only to shop recommended inventory at step 128 the method provides for the generation of a list of recommended items at step 129. Inventory is recommended based on the measurement information and the image of the client's face and head in the client profile, taking into account current styles, colors, and sizes of garments in the inventory, and garment details and characteristics. The goal of recommending certain items from the inventory is to make suggestions as to garments which would result in a better fit, and more appealing appearance. The list of recommended items will also conform to the shopping criteria obtained at step 124. The client can browse through a display of recommended inventory items at step 132. Referring now also to FIG. 1B, for each garment or inventory item the client chooses to view, the client is enabled to virtually try on a chosen garment and is provided a recommended size and a recommended set of alterations for that garment at step 140. The size and recommended alterations are generated using the three dimensional body scan provided by the scanner, or the measurements provided by the client in the client profile, along with the background information on the drafting and design process used by the garment maker of the chosen article. Recommended alterations could include hemming pants, letting sleeves down, taking a waist in or letting it out etc. In general these suggested sizes and alterations are displayed to a client while the client is virtually trying on clothes. When virtually trying on a chosen garment, the client is provided with a display of a photo-realistic 3-D image of themselves in a simulated garment of the same texture mapped shaded quality as that from step 120. In the preferred embodiment, three dimensional and physical information associated with a garment is used in physically simulating and photo-realistically rendering the garment on the 3-D virtual model of the client. In this way clothing is shown in the photo-realistic rendering as it would appear draped over the client's body, and the fabric in that rendering would have the same texture, color, and overall appearance as that of the actual clothing. This display would advantageously incorporate any recommended alterations or made to measure patterns and would enable the client to view the garment as would appear in its final form before purchase. After viewing a garment in this manner, the client is provided a choice at step 144 to simply search the inventory again and try on other garments at which point, step 124 would be recommended. At step 146, the client is provided the choice to place a garment in a hold area, so that they can physically inspect it and try it on at the retailer's premises in a conventional manner. In an exemplary embodiment, this could be provided to a client whether or not he or she is at home or at a kiosk at the premises of the retailer. At step 150 the client is provided a choice to purchase a garment of a ready to wear size available from a designer. If a client chooses to purchase such a garment, the three dimensional body scan or the measurements supplied by the client present in the client profile, along with the background information on the drafting and design process used by the garment maker of the chosen article are used by automated alteration technology to generate a set of alterations at step 152. These alterations are the same as the recommended alterations in the display at step 140. At step 154 the set of alterations is sent for garment alteration. Typically a dressmaker or tailor who may either be in house or simply convenient to the retailer will receive the set of alterations, and will perform step 156, the alteration of the garment which is done according to the generated alterations. In an exemplary embodiment the generated alterations is sent automatically via e-mail. Once the garment is altered according to the set of alterations, it is shipped to the client in step 158. In alternate embodiments the client may wish to receive the garment without any alterations made, sc that he or she could use the recommended alterations provided at step 140 (or 152) to have the garment altered to a proper fit. A choice of purchasing a custom size or made to measure garment is provided at step 160. If a client makes this choice, the three dimensional body scan or the measurements supplied by the client present in the client profile, and base sizes of the pattern (reference patterns associated with specific sizes and designers) are used by automated pattern generation technology to generate a made to measure pattern at step 162. At step 163 the generated pattern is sent for garment manufacturing. Typically, a garment manufacturer will receive the pattern, and will perform step 164, the manufacturing of the garment which is done according to the pattern. In an exemplary embodiment the generated pattern is sent automatically via e-mail to a just-in time manufacturer. Once the garment is manufactured according to the pattern, it is shipped to the client in step 166.

The preferred embodiment of the invention provides a convenient, effective and reliable way to fit, select, and process garments for clients. The efficiency and convenience afforded by the re-use of three dimensional information and the face and head image allows for a client to have his or her information entered once and would never need to be rescanned unless he or she underwent significant bodily or facial changes. The storing of the client information and its retrieval through the virtual ID provides for convenience and efficiency by allowing a client to remain at home or to virtually try on multiple garments at an in store kiosk without ever having to locate the garments and physically try them on and subsequently remove them. When the client is happy with a garment on his or her virtual model he or she can either put it on hold to actually try it on later, or can simply order the garment.

The method provides for reliable garment fitting, selection and creation by providing an accurate measurement through the use of a body scanner, providing an accurate photo-realistic 3-D image by using the measurements of the scanner and an image of the client and by physically simulating garments on the client's body. The method avoids the problems associated with relying solely on a computer generated image to guarantee fit and appearance, by providing an intelligent system which makes recommendations regarding inventory, recommendations with respect to garment sizes and required alterations, and provides custom made patterns for made to measure garments, all taking into account the specific body shape and size of the client, his or her face and head image, and the attributes of the garment, its construction, pattern and its manufacturer. The integration of a method which displays a virtual model, with the provision of automatic pattern generation and garment manufacture also guarantees that the fabric the client sees on the virtual model is the same as that used by a manufacturer in the creation of the garment. The result is an appropriate fit without the expense, inconvenience, and risk of using any particular tailor, and a garment whose appearance on the client is exactly what is expected.

It should be understood that this method may be carried out other than how it is described and may optionally be carried out in whole or in part by a system, using software or hardware or using any combination of software and hardware and input from individuals which perform or initiate steps of the method. It should also be understood that the method may be embodied in whole or in part as a computer program stored on a computer readable medium located at the retailer's premises, a central server, or elsewhere. It is to be understood that various steps of the method may be carried out by an automated system, and that individuals may be used in initiating, with or without the aid of an automated system, other various steps of the process.

Numerous modifications and variations of the present invention are possible in light of the above teachings. It is therefore to be understood that within the scope of the appended claims, the invention may be practiced otherwise than as specifically described herein.

The invention claimed is:

1. A method of fitting, selecting and processing a garment for an individual comprising:
    spatially measuring the individual to obtain spatial measurements of the individual;
    obtaining an image of a face and head of the individual;
    obtaining shopping criteria;
    generating recommended garments conforming to the shopping criteria;
    displaying the recommended garment from which the individual can choose a selected garment;
    creating and displaying a virtual photo-realistic 3-D image simulating visually and physically how the selected garment would appear and behave when worn by the individual using the spatial measurements of the individual and the image of a face and head of the individual; and
    generating specifications for processing the selected garment using the spatial measurements of the individual and information regarding the garment.

2. A method according to claim 1 wherein spatially measuring the individual comprises taking a three dimensional body scan of the individual.

3. A method according to claim 1 wherein spatially measuring the individual comprises obtaining spatial measurements from the individual.

4. A method according to claim 1 wherein obtaining an image of a face and head of the individual comprises taking a visual scan of a face and head of the individual.

5. A method according to claim 1 wherein obtaining an image of a face and head of the individual comprises obtaining a copy of an image of a face and head of the individual from the individual.

6. A method according to claim 1 wherein simulating visually how the garment would appear comprises true color 3-D textured shaded rendering of the garment and the individual.

7. A method according to claim 1 wherein simulating physically how the garment would behave when worn by the individual comprises simulating physically how the garment would drape on the individual.

8. A method according to claim 1 wherein generating specifications for processing the garment comprises generating a pattern for use in manufacturing the garment.

9. A method according to claim 1 wherein generating specifications for processing the garment comprises generating a recommended set of alterations for use in altering the garment.

10. A method according to claim 1 wherein the shopping criteria is comprised of any number of criteria selected from the group consisting of price range, style, designer, color, and fit of the desired garments.

11. A method of fitting, selecting and processing garments for an individual comprising:
spatially measuring the individual to obtain spatial measurements of the individual;
obtaining an image of a face and head of the individual;
storing the spatial measurements of the individual and the image of a face and head of the individual as stored information in an individual profile;
obtaining shopping criteria;
generating recommended garments conforming to the shopping criteria;
displaying the recommended garment from which the individual can choose a selected garment;
creating and displaying a virtual photo-realistic 3-D image simulating visually and physically how the selected garment would appear and behave when worn by the individual using the stored information in the individual profile; and
generating specifications for processing the selected garment using the stored information in the individual profile and information regarding the selected garment.

12. A method according to claim 11 wherein spatially measuring the individual comprises taking a three dimensional body scan of the individual.

13. A method according to claim 11 wherein spatially measuring the individual comprises obtaining spatial measurements from the individual.

14. A method according to claim 11 wherein obtaining an image of a face and head of the individual comprises taking a visual scan of a face and head of the individual.

15. A method according to claim 11 wherein obtaining an image of a face and head of the individual comprises obtaining a copy of an image of a face and head of the individual from the individual.

16. A method according to claim 11 wherein providing the individual with a choice of garments to view comprises providing web pages for viewing on the internet.

17. A method according to claim 11 wherein providing the individual with a choice of garments to view comprises providing a computer kiosk at a shopping facility.

18. A method according to claim 11 wherein providing the individual with a choice of garments to view comprises:
providing a list of recommended inventory from an inventory to the individual,
wherein the list of recommended inventory is generated using the spatial measurements of the individual and the image of a face and head of the individual and information regarding garments of the inventory.

19. A method according to claim 11 wherein simulating visually how the selected garment would appear comprises true color 3-D textured shaded rendering of the selected garment and the individual.

20. A method according to claim 11 wherein simulating physically how the selected garment would behave when worn by the individual comprises simulating physically how the selected garment would drape on the individual.

21. A method according to claim 11 wherein generating specifications for processing the selected garment comprises generating a pattern for use in manufacturing the selected garment.

22. A method according to claim 11 wherein generating specifications for processing the selected garment comprises generating a recommended set of alterations for use in altering the selected garment.

23. A method according to claim 11 further comprising: sending the specifications for processing the selected garment for use in processing the selected garment; processing the selected garment according to the specifications for processing the selected garment; and shipping the selected garment to the individual.

24. A method according to claim 23 wherein spatially measuring the individual comprises taking a three dimensional body scan of the individual.

25. A method according to claim 23 wherein spatially measuring the individual comprises obtaining spatial measurements from the individual.

26. A method according to claim 23 wherein obtaining an image of a face and head of the individual comprises taking a visual scan of a face and head of the individual.

27. A method according to claim 23 wherein obtaining an image of a face and head of the individual comprises obtaining a copy of an image of a face and head of the individual from the individual.

28. A method according to claim 23 wherein providing the individual with a choice of garments to view comprises providing web pages for viewing on the internet.

29. A method according to claim 23 wherein providing the individual with a choice of garments to view comprises providing a computer kiosk at a shopping facility.

30. A method according to claim 23 wherein providing the individual with a choice of garments to view comprises: providing a list of recommended inventory from an inventory to the individual, wherein the list of recommended inventory is generated using the spatial measurements of the individual and the image of a face and head of the individual and information regarding garments of the inventory.

31. A method according to claim 23 wherein simulating visually how the selected garment would appear comprises true color 3-D textured shaded rendering of the selected garment and the individual.

32. A method according to claim 23 wherein simulating physically how the selected garment would behave when worn by the individual comprises simulating physically how the selected garment would drape on the individual.

33. A method according to claim 23 wherein: generating specifications for processing the selected garment comprises generating a pattern for use in manufacturing the selected garment; sending specifications for processing the selected garment comprises automatically sending the pattern for use in manufacturing the selected garment; and processing the selected garment comprises manufacturing the selected garment according to the pattern.

34. A method according to claim 23 wherein: generating specifications for processing the selected garment comprises generating a recommended set of alterations for use in altering the selected garment; sending specifications for processing the selected garment comprises automatically sending the recommended set of alterations for use in altering the selected garment; and processing the selected garment comprises altering the selected garment according to the recommended set of alterations.

35. A method according to claim 11 wherein the shopping criteria is comprised of any number of criteria selected from the group consisting of price range, style, designer, color, and fit of the desired garments.

36. A computer program stored on a computer readable medium for implementing a method of fitting, selecting and processing a garment for an individual, said computer program adapted to:
- measure the individual to obtain spatial measurements of the individual;
- obtain an image of a face and head of the individual;
- obtaining shopping criteria;
- generating recommended garments conforming to the shopping criteria;
- displaying the recommended garment from which the individual can choose a selected garment;
- create and display a virtual photo-realistic 3-D image simulating visually and physically how the garment would appear and behave when worn by the individual using the spatial measurements of the individual and the image of a face and head of the individual; and
- generate specifications for processing the garment using the spatial measurements of the individual and information regarding the garment.

37. A computer program stored on a computer readable medium for implementing a method of fitting, selecting and processing garments for an individual, said computer program adapted to:
- measure the individual to obtain spatial measurements of the individual;
- obtain an image of a face and head of the individual;
- store the spatial measurements of the individual and the image of a face and head of the individual as stored information in an individual profile;
- obtaining shopping criteria;
- generating recommended garments conforming to the shopping criteria;
- displaying the recommended garment from which the individual can choose a selected garment;
- create and display a virtual photo-realistic 3-D image simulating visually and physically how the selected garment would appear and behave when worn by the individual using the stored information in the individual profile; and
- generate specifications for processing the selected garment using the stored information in the individual profile and information regarding the selected garment.

38. A computer program according to claim 37 further adapted to:
- send the specifications for processing the selected garment for use in processing the selected garment;
- process the selected garment according to the specifications for processing the selected garment; and
- ship the selected garment to the individual.

39. An automated system comprising software and hardware for implementing a method of fitting, selecting and processing a garment for an individual, said automated system adapted to:
- measure the individual to obtain spatial measurements of the individual;
- obtain an image of a face and head of the individual;
- obtaining shopping criteria;
- generating recommended garments conforming to the shopping criteria;
- displaying the recommended garment from which the individual can choose a selected garment;
- create and display a virtual photo-realistic 3-D image simulating visually and physically how the garment would appear and behave when worn by the individual using the spatial measurements of the individual and the image of a face and head of the individual; and
- generate specifications for processing the garment using the spatial measurements of the individual and information regarding the garment.

40. An automated system comprising software and hardware for implementing a method of fitting, selecting and processing a garment for an individual, said automated system adapted to:
- measure the individual to obtain spatial measurements of the individual;
- obtain an image of a face and head of the individual;
- store the spatial measurements of the individual and the image of a face and head of the individual as stored information in an individual profile;
- obtaining shopping criteria;
- generating recommended garments conforming to the shopping criteria;
- displaying the recommended garment from which the individual can choose a selected garment;
- create and display a virtual photo-realistic 3-D image simulating visually and physically how the selected garment would appear and behave when worn by the individual using the stored information in the individual profile; and
- generate specifications for processing the selected garment using the stored information in the individual profile and information regarding the selected garment.

41. An automated system according to claim 40 further adapted to:
- send the specifications for processing the selected garment for use in processing the selected garment;
- process the selected garment according to the specifications for processing the selected garment; and
- ship the selected garment to the individual.

* * * * *